US008333558B2

(12) United States Patent
Finn et al.

(10) Patent No.: US 8,333,558 B2
(45) Date of Patent: Dec. 18, 2012

(54) CONTAINMENT CASES AND METHOD OF MANUFACTURE

(75) Inventors: Scott Roger Finn, Niskayuna, NY (US); Deepali Bhate, Rexford, NY (US); Curt Brian Curtis, West Chester, OH (US); Stephen Mark Whiteker, Covington, KY (US); Qi Zhu, Niskayuna, NY (US); Lee Alan Blanton, Cincinnati, OH (US); Edward Atwood Rainous, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 912 days.

(21) Appl. No.: 12/042,692

(22) Filed: Mar. 5, 2008

(65) Prior Publication Data

US 2009/0226310 A1 Sep. 10, 2009

(51) Int. Cl.
*F01D 21/00* (2006.01)

(52) U.S. Cl. ....... 415/200; 415/9; 415/173.1; 415/173.3
(58) Field of Classification Search .............. 415/9, 200, 415/173.1, 173.3
See application file for complete search history.

(56) References Cited

U.S. PATENT DOCUMENTS

| | | | | |
|---|---|---|---|---|
| 4,818,176 | A * | 4/1989 | Huether et al. | 415/9 |
| 5,403,148 | A | 4/1995 | Forrester | |
| 5,436,042 | A | 7/1995 | Lau et al. | |
| 5,447,411 | A | 9/1995 | Curley et al. | |
| 6,030,563 | A | 2/2000 | Strasser et al. | |
| 6,113,347 | A | 9/2000 | Forrester | |
| 6,179,551 | B1 * | 1/2001 | Sathianathan et al. | 415/9 |
| 7,125,217 | B2 * | 10/2006 | Care | 415/9 |
| 7,246,990 | B2 | 7/2007 | Xie et al. | |
| 8,061,966 | B2 * | 11/2011 | Xie et al. | 415/9 |
| 2009/0022579 | A1 * | 1/2009 | Schlichting et al. | 415/144 |

* cited by examiner

*Primary Examiner* — Ninh H Nguyen
*Assistant Examiner* — Liam McDowell
(74) *Attorney, Agent, or Firm* — Penny A. Clarke (57) ABSTRACT

A containment case comprises a composite core, with an inner surface, and at least one ceramic layer integrated with the composite core. The at least one ceramic layer is bonded to the inner surface of the composite core with a resin. In another embodiment, a containment case comprises a composite core, with an inner surface, and a hybrid material comprising at least one ceramic material and at least one non-ceramic material. The hybrid material is disposed on the inner surface of the composite core. The hybrid material is bonded to the inner surface of the composite core with a resin. A method of fabricating a containment case includes the steps of disposing one or more layers of ceramic fabric on an inner surface of a composite core, infusing the composite core and the one or more layers of ceramic fabric with resin, and curing the resin.

17 Claims, 9 Drawing Sheets

CONTAINMENT CASES AND METHOD OF MANUFACTURE

BACKGROUND

The invention relates generally to containment cases and, more particularly, to containment cases with enhanced impact resistance.

Gas turbine engines are extensively used to propel an aircraft. Typically used turbofan engines include large, ducted fans placed at the front of the engine. The fan serves to produce greater thrust and reduce specific fuel consumption. During the operation of such engines, there is a remote possibility that a foreign body, such as a bird, could impact the fan and cause severe fan damage. That damage could result in part or all of a fan blade becoming detached from the hub and impacting the fan casing. Such a detached fan blade could cause considerable damage to the aircraft powered by the engine if it were not contained by the fan casing. Similar damage could also result if the fan blade suffered failure through fatigue. In order to prevent such damage, various containment systems have been employed. Conventional containment casings are typically solid metal casings having a thickness sufficient to withstand the impact of a fan blade within the plane of the fan. However, blade containment achieved by these methods generally incurs significant additional weight.

Composite materials are being evaluated for use in containment casings and would provide considerable weight benefits. However, composites can be subject to puncture at the interior surface of the containment casing. In particular, composite fan containment cases are susceptible to damage due to sharp object impact. Accordingly, it would be advantageous to provide an improved containment casing with improved impact resistance.

Monolithic ceramic plates are used in the armor industry to provide an effective barrier. However, monolithic plates would not be desirable for aircraft engine applications, due to the possibility of fragmentation, as well as installation maintainability issues. Accordingly, it would be desirable to achieve the impact-resistance benefits of armor plating, while eliminating above-noted problems associated with the use of such plates in aircraft engine applications.

SUMMARY OF THE INVENTION

Briefly, one aspect of the invention resides in a containment case comprising a composite core, with an inner surface, and at least one ceramic layer integrated with the composite core. The at least one ceramic layer is bonded to the inner surface of the composite core with a resin.

Another aspect of the invention is directed to a containment case comprising a composite core, with an inner surface, and a hybrid material comprising at least one ceramic material and at least one non-ceramic material. The hybrid material is disposed on the inner surface of the composite core. The hybrid material is bonded to the inner surface of the composite core with a resin.

Yet another aspect of the invention resides in a method of fabricating a containment case. The method comprises the steps of disposing one or more layers of ceramic fabric on an inner surface of a composite core, infusing the composite core and the one or more layers of ceramic fabric with resin, and curing the resin.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In the following description, like reference characters designate like or corresponding parts throughout the several views shown in the figures. It is also understood that terms such as "top," "bottom," "outward," "inward," "first," "second," and the like are words of convenience and are not to be construed as limiting terms. Furthermore, whenever a particular aspect of the invention is said to comprise or consist of at least one of a number of elements of a group and combinations thereof, it is understood that the aspect may comprise or consist of any of the elements of the group, either individually or in combination with any of the other elements of that group.

Referring to the drawings in general, it will be understood that the illustrations are for the purpose of describing particular embodiments of the invention and are not intended to limit the invention thereto.

Figure 1:
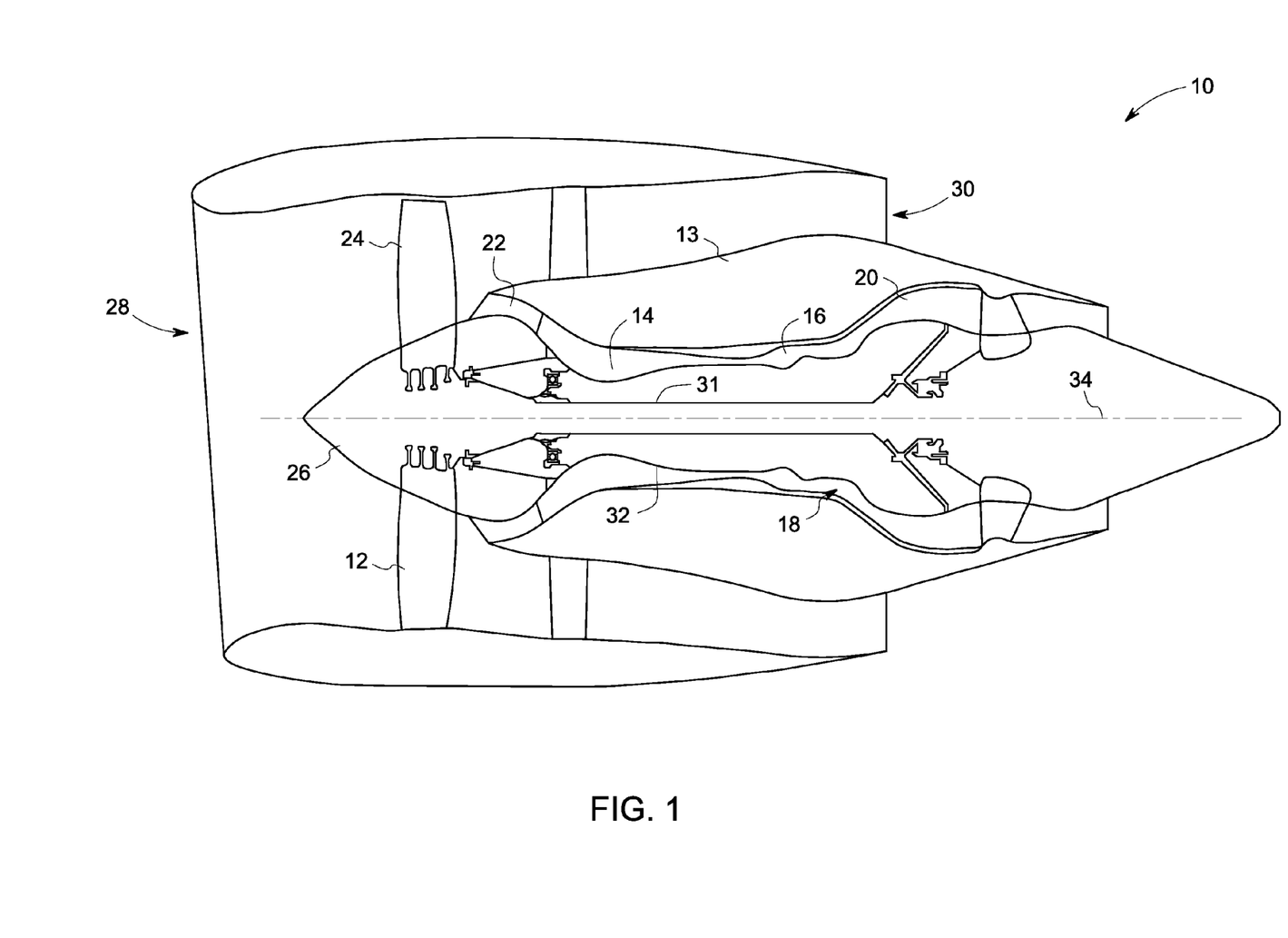
FIG. 1 is a schematic illustration of a gas turbine engine.

A fan containment casing 40, 50, 60 for a gas turbine engine 10 is described in detail below. FIG. 1 schematically illustrates a gas turbine engine 10. The present invention is not limited to use in a specific gas turbine engine, and the engine shown in FIG. 1 is for illustrative purposes only. Gas turbine 10 includes a fan assembly 12 and a core engine 13 including a high-pressure compressor 14, a low pressure turbine 20, and a booster 22. Fan assembly 12 includes an array of fan blades 24 extending radially outward from a rotor disc 26. Engine 10 has an intake side 28 and an exhaust side 30. Fan assembly 12 and turbine 20 are coupled by a first rotor shaft 31, and compressor 14 and turbine 18 are coupled by a second rotor shaft 32.

During operation, air flows through fan assembly 12, along a central axis 34, and compressed air is supplied to high-pressure compressor 14. The highly compressed air is delivered to combustor 16. Airflow (not shown in FIG. 1) from combustor 16 drives fan assembly 12 by way of shaft 31.

Figure 2:
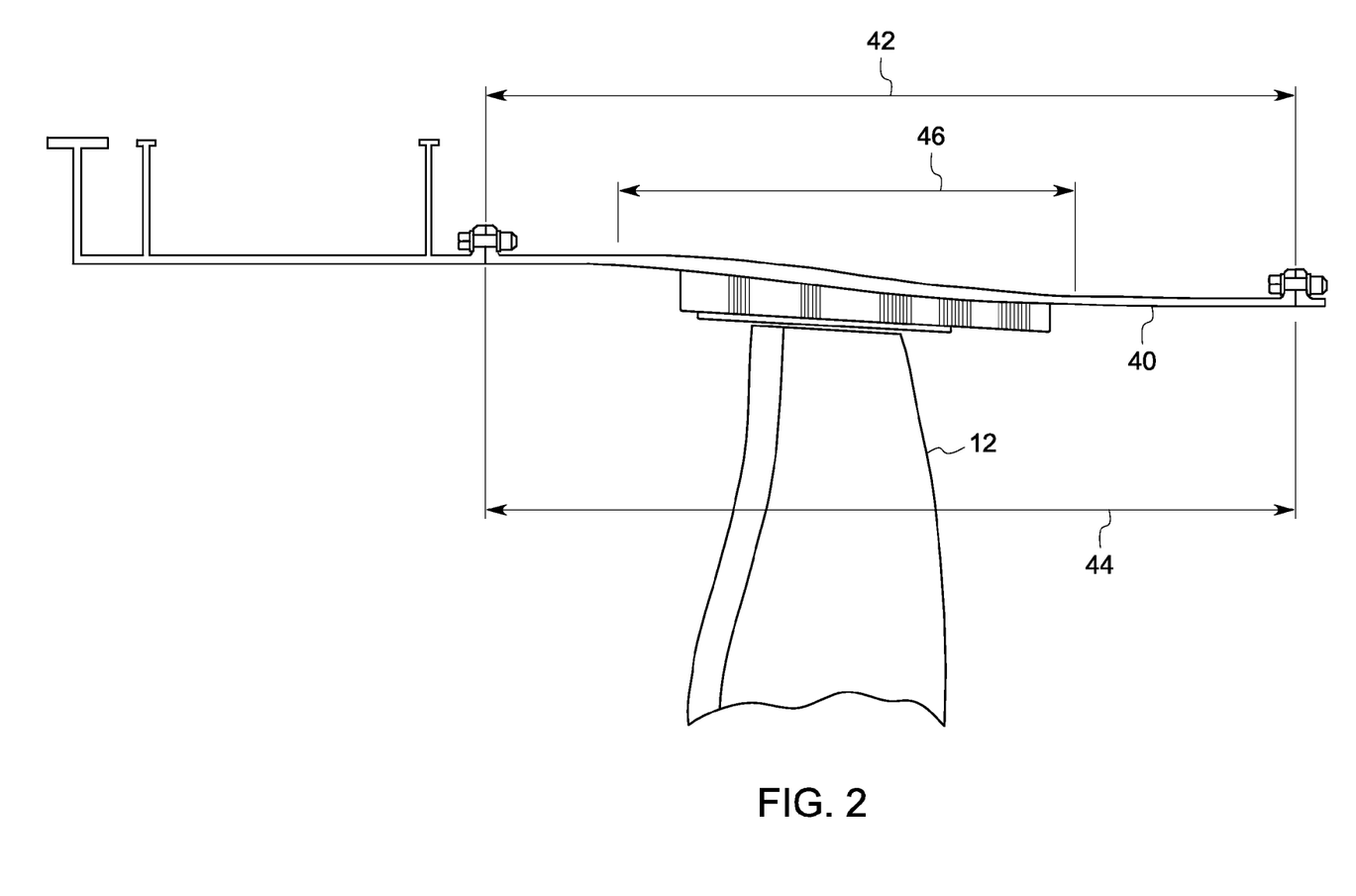
FIG. 2 is a schematic cross section illustration of a portion of the fan containment case shown in FIG. 1.
Figure 3:
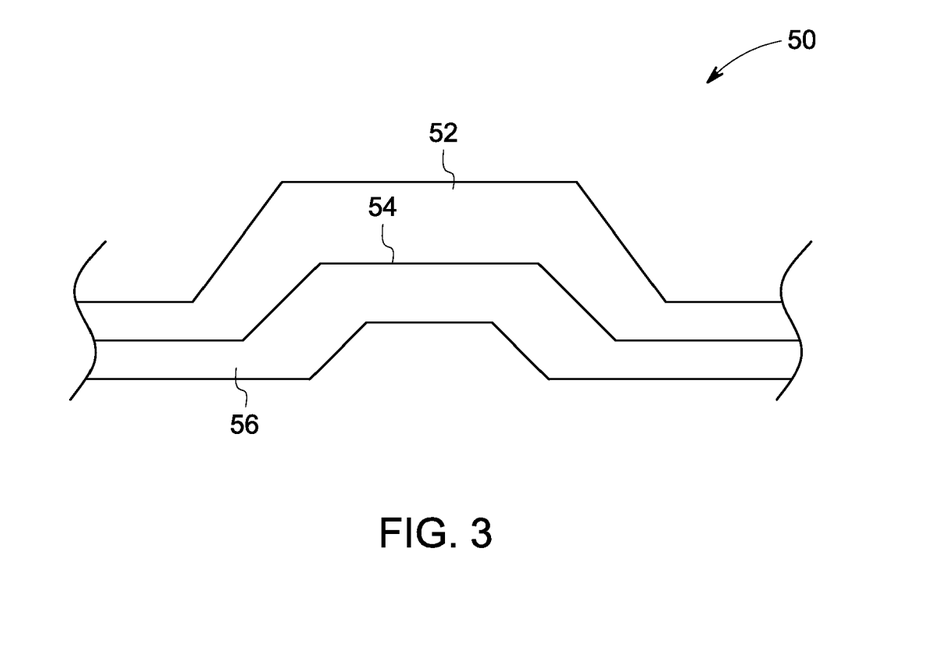
FIG. 3 is a schematic cross section illustration of a portion of the fan containment case shown in FIG. 2, in accordance with an exemplary embodiment of the present invention.

FIG. 2 is a schematic cross-section illustration of a fan containment case 40, and FIG. 3 is a schematic cross-section illustration of a portion of fan containment casing 10. Referring to FIG. 2, in an exemplary embodiment, engine containment case 40 is a hardwall containment system that includes a length 42 that is approximately equal to a fan assembly length 44. More specifically, length 42 circumscribes a primary impact region 46 of the fan assembly 12. "Primary impact region" as defined herein imply a region extending both axially and circumferentially around the inner surface of the composite core where a fan blade is most likely to be ejected from the fan assembly. The details of the containment case 40 will be described in detail below.

Figure 9:
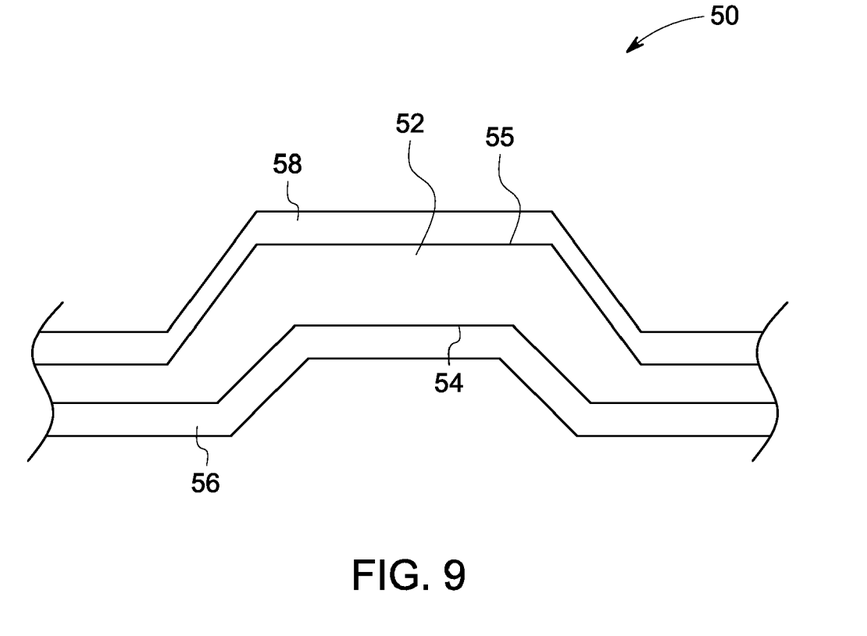
FIG. 9 is a schematic cross section illustration of a portion of the fan containment case shown in FIG. 1, in accordance with an exemplary embodiment of the present invention.

In the exemplary embodiments shown in FIGS. 3 and 9, containment case 50 comprises a composite core 52 with an inner surface 54. As indicated in FIGS. 3 and 9, at least one ceramic layer 56 is integrated with the composite core 52. The ceramic layer(s) 56 is bonded to the inner surface 54 of the composite core 52 with a resin. For the example arrangement shown in FIG. 9, at least one ceramic layer 58 is integrally bonded to an outer surface 55 of the composite core 52. Beneficially, the outer ceramic layer(s) 58 would reduce thermal deformation of the case due to the thermal expansion mismatch between the ceramic and the composite materials. For the illustrated embodiments, the ceramic layers 56 are coextensive with a length of the composite core. However, for other embodiments, the ceramic layers are locally disposed. For example, the ceramic layers may be situated by the leading edge of the fan blades to provide local, enhanced impact resistance.

In a number of applications, the ceramic layer 56 comprises a ceramic fabric. The ceramic fabric may comprise any of the various fabric architectures available. The selection of the fabric architecture may depend on several factors. These factors include the directionality of the stress to which the fabric will be subjected to, the degree of fiber in the fabric, and various other factors. The ceramic fabric may be a woven fabric, non-woven, a wrap, a blanket, a knitted fabric, a carded non-woven fabric, or a braided fabric. The most familiar fabrics are two and three-dimensional. When the ceramic fabric is a woven fabric, the fabric may be biaxial or triaxial. The ceramic fibers may be chopped fibers, continuous monofilament, a tow, a yarn, or roving consisting of a multitude of monofilaments, or continuous fiber tows or yarns may be made from shorter fibers and woven into a fabric. One skilled in the art would select a specific fabric architecture depending on the end use requirements.

In certain embodiments, the ceramic layer 56 comprises at least one ceramic material. Some examples of suitable ceramic materials include, but are not limited to, alumina, silica, zirconia, boron, quartz, silicon carbide, titanium dioxide, tungsten carbide, boron oxide, and combinations thereof. In other embodiments, the ceramic layer comprises a fabric comprising at least two ceramic materials. One skilled in the art would select a ceramic material based on the end use requirement. These ceramic materials, because of their low relative density, provide advantages of light-weight, at the same time provide high mechanical strength compared to conventionally used metals. Additionally, ceramics have higher hardness and stiffness than conventional glass fibers. Therefore, composite containment cases comprising ceramic layers contribute minimum additional weight for the same degree of protection.

Any suitable reinforcing fabric such as a ceramic fabric or a non-ceramic fabric may be used in the composite core 52. Some examples of non-ceramic fabrics include, but are not limited to, carbon fiber, graphite fiber, polyimide fiber, or aromatic polyamide fiber, ultra-high molecular weight polyethylene, and combinations thereof. Ultra-high molecular weight polyethylene provides relatively high energy absorption and is sold, for example, under the tradenames Spectra® and Dyneema®. Spectra® fiber is sold by Honeywell Specialty Materials, Morris N.J. Dyneema® fiber is sold by Dutch State Mines (DSM), the Netherlands. In an exemplary embodiment, the non-ceramic fabric comprises carbon fiber, which provides high mechanical strength.

Any suitable polymeric resin may be used in bonding the ceramic layer 56 with the composite core 52. Example resins include, but are not limited to, a thermosetting resin, a thermoplastic resin, or a combination of resins. Some examples of thermosetting resins include, but are not limited to, epoxies, bismaleimides, phenolics, alkyds, aminoresins, polyesters, epoxides, silicones, vinyl esters, and urethanes. Some examples of suitable thermoplastic resins include, but are not limited to, polyetheretherketone (PEEK), polyetherketoneketone (PEKK), polyetherimide (PEI), Polyphenylene Sulfide (PPS), and combinations thereof.

Figure 4:
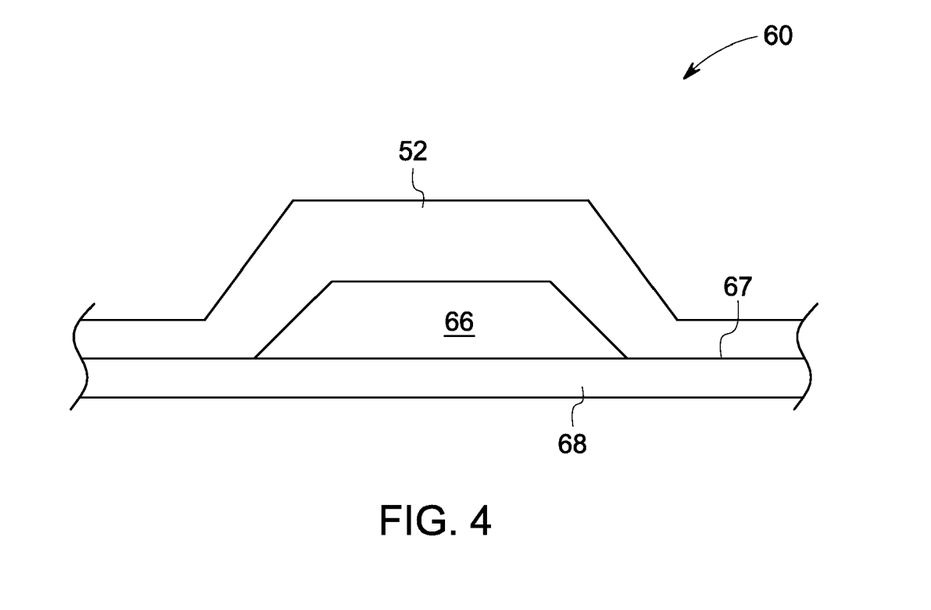
FIG. 4 is a schematic cross section illustration of a portion of the fan containment case shown in FIG. 2, in accordance with another exemplary embodiment of the present invention.
Figure 10:
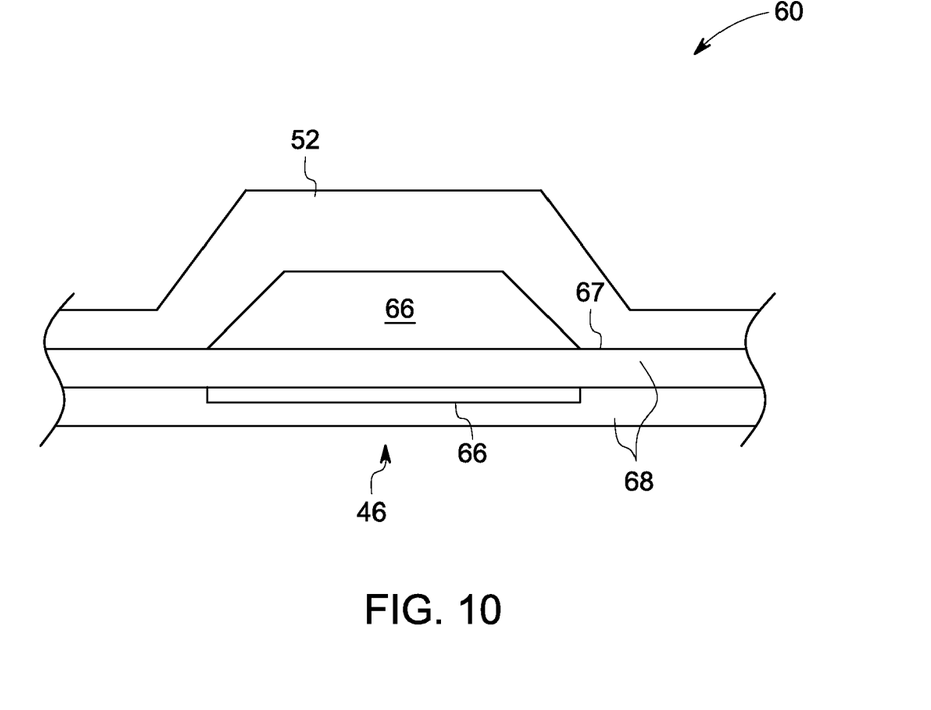
FIG. 10 illustrates a fan containment case embodiment of the present invention with alternating ceramic and composite layers.

The thickness, composition, and position of various layers of the containment case may be designed based on the required physical properties, and end use application. FIG. 4 schematically illustrates a cross-section of a portion of the fan containment casing 60 shown in FIG. 2, in which at least one composite layer 68 is disposed on an inner surface 67 of the at least one ceramic layer 66, as shown in FIG. 4. Example materials for composite layer 68 include reinforcing fabric comprising one or more of: carbon fiber, graphite fiber, polyimide fiber, or aromatic polyamide fiber, ultra-high molecular weight polyethylene, and combinations thereof. Beneficially, such a configuration allows for a continuous layer of material across the entire length of the fan case and helps reduce the tendency for the ceramic layer to peel away from the core composite layer. FIG. 10 schematically depicts, in cross-section, a portion of a containment case 60 that includes a number of ceramic layers 66 disposed in the prime containment zone or primary impact region 46 and a number of non-ceramic layers 68, where the ceramic layers 66 and the non-ceramic layers 68 are situated alternately to enhance an impact resistance of an inner portion of the containment case. In the above embodiments, the thicknesses of the various layers can be determined empirically, and vary widely depending on the materials used, and the design criteria.

Another exemplary containment case embodiment of the invention is described with reference to FIG. 3. As indicated for example in FIG. 3, the containment case 50 includes a composite core 52 with an inner surface 54. The containment case 50 further includes a hybrid material (which is also indicated by reference numeral 56) comprising at least one ceramic material and at least one non-ceramic material. For these embodiments, the hybrid material 56 is disposed on the inner surface 54 of the composite core 52. In particular, the hybrid material is bonded to the inner surface 54 of the composite core 52 with a resin.

In one embodiment, the hybrid material forms a graded structure characterized by a gradual transition in composition of the ratio of the ceramic material to the non-ceramic material. More particularly, the hybrid material transitions from having a low ratio of the ceramic to composite at the inner surface 54 of the composite core 52 to having a high ratio of ceramic to composite at the outer surface of the hybrid material. For particular embodiments, the ceramic and non-ceramic materials comprise ceramic and non-ceramic fibers, respectively. In more particular embodiments, the ceramic and non-ceramic fibers are interwoven to form the hybrid material. In other embodiments, the ceramic and non-ceramic fibers are braided together to form the hybrid material. Typically, the hybrid material extends over a primary impact region of the inner surface of the composite core. Typically, the hybrid material extends along a length of the composite core. Beneficially, the use of the hybrid material could reduce weight and/or cost. In addition, the graded transition would reduce the effects of the thermal expansion mismatch between the composite and ceramic materials.

Beneficially, by integrating the ceramic layer(s) with the composite core, the above noted problems associated with monolithic ceramic plates are eliminated. In this manner, the containment case receives the benefit of the shear strength and hardness of the ceramic layer(s) at the impact zones, so that hard objects are deflected from the casing at impact without puncturing the containment case. Because the ceramic layers are integrated with the composite core, they are not subject to fragmentation at impact.

Figure 5:
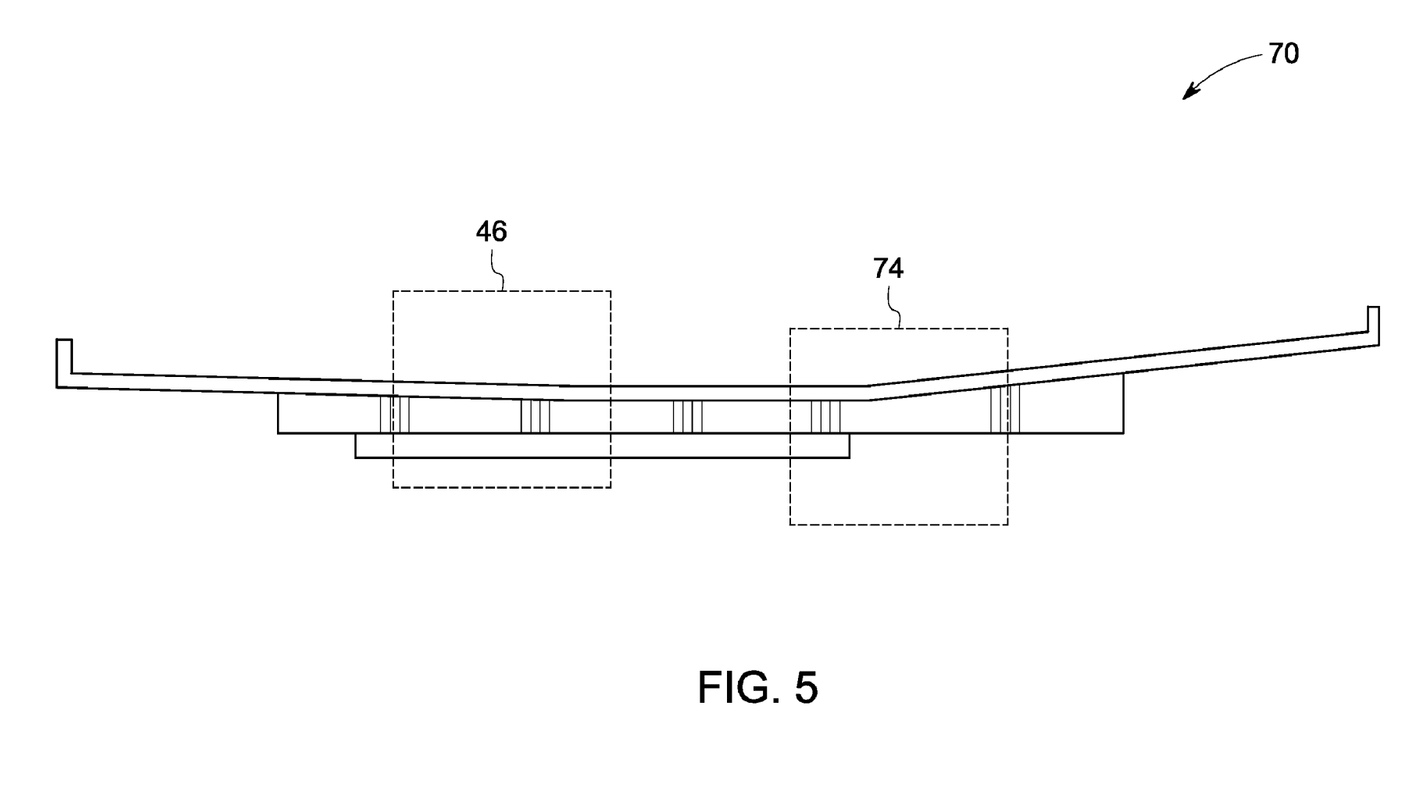
FIG. 5 is a schematic cross section illustration of a portion of a constant thickness containment case embodiment of the invention.
Figure 7:
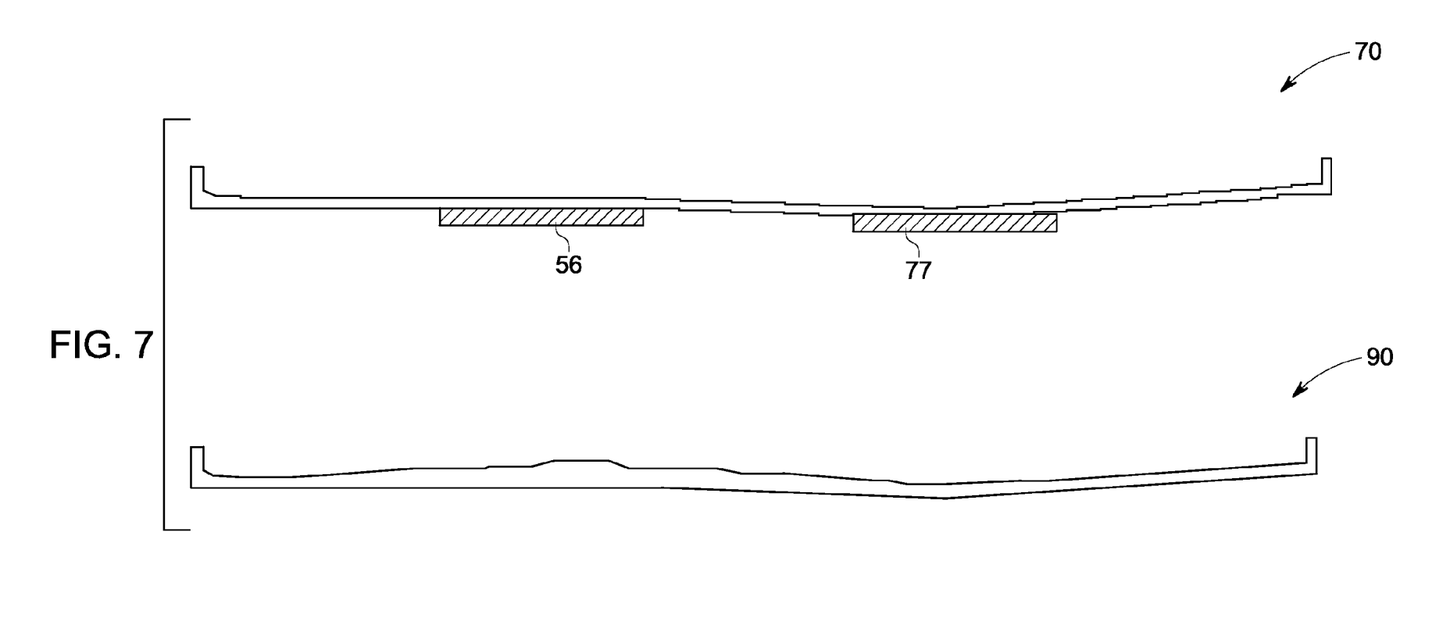
FIG. 7 is a schematic cross section illustration showing a constant thickness containment case embodiment of the invention as well as a conventional containment case.

Another benefit of the present invention is that it facilitates the fabrication of a constant thickness containment case. FIG. 5 schematically illustrates a constant thickness containment case 70. In such embodiments, the containment case 70 is characterized by a substantially uniform thickness over an axial length of the containment case including a primary impact region 46 and a root impact region 74. FIG. 7 shows a constant thickness containment case 70 with ceramic layer 56 and energy-absorbing layer 77. A conventional containment case 90 is also shown in FIG. 7. Conventional containment cases 90 require reinforcements in the primary and root impact regions, which may make the manufacturing process for composite cases more involved. By comparison, constant thickness composite case 70 will be easy to manufacture and thus provides the advantages of easy manufacturability and low manufacturing cost.

Figure 6:
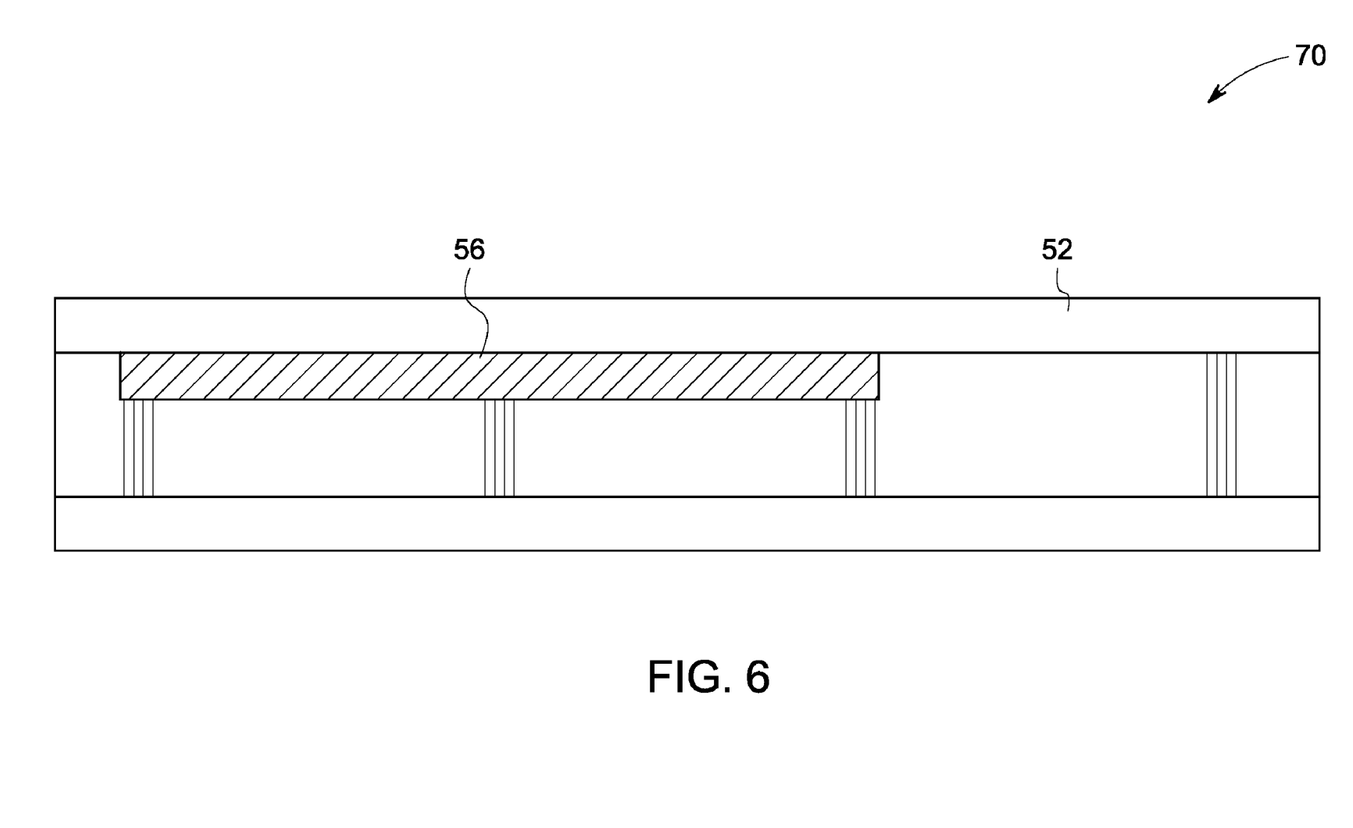
FIG. 6 is an enlarged view of the primary impact region of the containment case shown in FIG. 5.

An enlarged view of the primary impact region 46 of constant thickness containment case 70 is shown in FIG. 6. As shown for example in FIG. 6, ceramic fabric layer 56 is integrated with composite core 52 in the primary impact region 46 and the root impact region 74.

Figure 11:
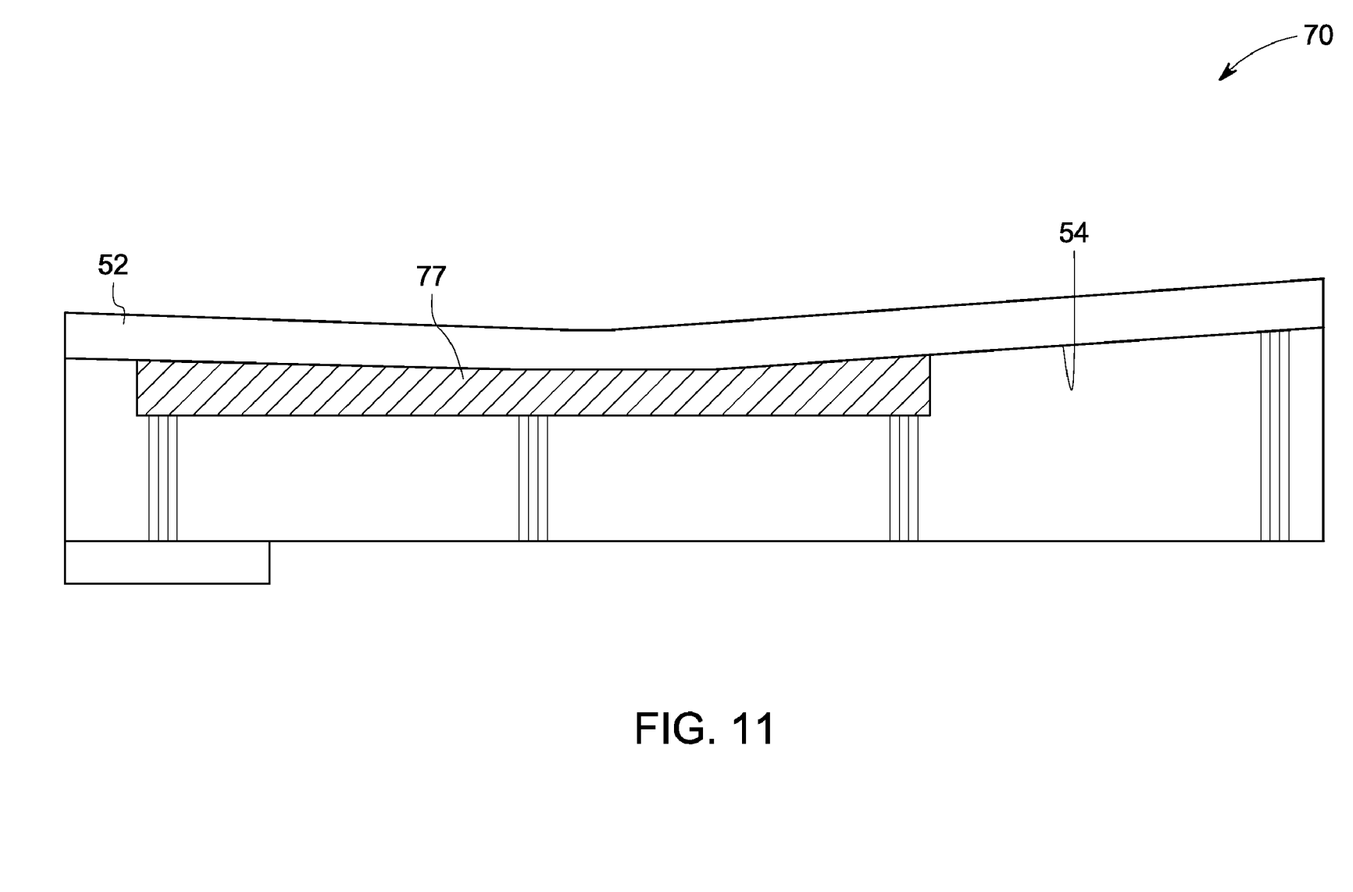
FIG. 11 is an enlarged view of the root impact region of the containment case shown in FIG. 5.

An enlarged view of the root impact region 74 of constant thickness containment case 70 is shown in FIG. 11. As shown for example in FIG. 11, constant thickness containment case 70 comprises an energy-absorbing layer 77 disposed within the root impact region on the inner surface 54 of the composite core 52. For particular embodiments, the energy-absorbing layer 77 comprises an energy absorbing material selected from the group consisting of polyurethane, rubber, silicone, fluorosilicone, fluoroelastomer, and combinations thereof. One non-limiting example of a fluoroelastomer is marketed under the tradename VITON® and is commercially availably from DuPont Performance Elastomers.

The above described containment cases have exceptional impact resistance and damage tolerance properties and provide significant weight savings compared to conventional metallic cases. The composite containment cases of the invention facilitate containing a released blade or blade part within the containment case in the event a blade is released from the engine during operation, and effectively protect other parts of the engine.

Figure 8:
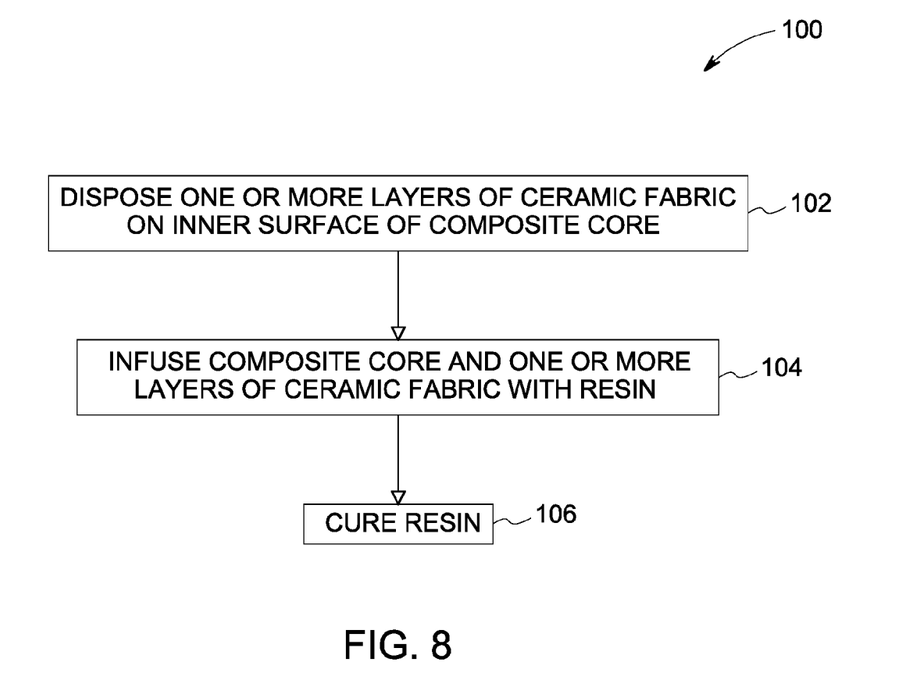
FIG. 8 is a flow chart of a method of fabricating a containment case, according to one embodiment of the invention.

A method for fabricating a containment case is described with reference to FIG. 8. Containment cases of any desired shape may be formed by any suitable forming technique, such as resin transfer molding (RTM), vacuum assisted resin transfer molding (VARTM), resin film infusion, thermoforming, as well as vacuum forming, such as vacuum infusion or pressure injection, and other techniques. As indicated for example in FIG. 8, the method 100 includes disposing one or more layers of ceramic fabric on an inner surface of a composite core, in step 102. At step 104, the composite core and the layer(s) of ceramic fabric are infused with resin. The resin is cured in step 106.

Regarding step 102, the number and position of the various layers depend on the configuration of the composite case. For example, the ceramic layer may be disposed at the inner or the outer surface of the composite core depending on the design criteria. Typically, these layers are provided in a mold. The shape, size and configuration of the mold may depend, in part, on the shape and size of the composite case to be manufactured. Molds and associated parts are known in the art and are not described in detail herein.

Regarding step 104, the infusion of the resin is controlled by a pressure gradient, for a resin transfer molding process. The number and position of the sources of pressure gradient and resin injection partly depends on the specific system design and the resin article configuration. Each resin and vacuum source may be controlled individually using a valve or other means of stopping the flow of material. The flow of resin may be stopped when sufficient resin has entered the mold. The flow may be controlled by properly adjusting the resin gel time and/or measuring the amount of resin that has entered the mold and stopping the flow of resin when a pre-metered amount of resin has entered the mold, or using a sensor to control the flow of resin into the mold. One skilled in the art would be able to control infusion of resins based on the specific requirements.

Regarding step 106, the resins may be catalyzed for high temperature cure or room temperature cure and for various cures times as is compatible with the needs of the process. The resins may be properly catalyzed and degassed prior to injection into the fiber preform. The wide variety of useful resins and the methods of preparing the resins are all widely known in the art. One skilled in the art would know how to choose a suitable resin and process it depending on the end use application.

The method optionally further includes the step of disposing one or more layers of a composite material on an inner surface defined by the layer(s) of ceramic fabric, as discussed above with reference to FIG. 4. In such embodiments, the infusing step comprises infusing the composite core, the layer(s) of ceramic fabric and the layer(s) of a composite material with the resin.

The method further optionally includes the step of alternately disposing layers of a composite material with the layer(s) of the ceramic fabric, as discussed above with reference to FIG. 10. In such embodiments, the infusing step comprises infusing the composite core, the layer(s) of ceramic fabric and the layer(s) of composite material with the resin.

For the illustrated methods, the ceramic layer may comprise any suitable material including the ceramic fabrics listed above with reference to the composite case embodiments. In certain embodiments, the ceramic layer is a hybrid material comprising at least one ceramic material and at least one non-ceramic material. In certain embodiments, the method optionally includes disposing a ceramic layer on an outer surface of the composite core prior to performing the infusing step.

The ceramic layer would typically be wrapped around the case and held in place prior to infusion with a tackifying agent. Different types of tackifiers and methods of application are well known to those skilled in the art and are not repeated here. The same resin infusion procedure can be applied to this configuration as was outlined previously Although only certain features of the invention have been illustrated and described herein, many modifications and changes will occur to those skilled in the art. It is, therefore, to be understood that the appended claims are intended to cover all such modifications and changes as fall within the true spirit of the invention. It should be understood that though the above embodiments are discussed with respect to a containment case for a turbo machinery, the embodiments of the invention may be utilized in other applications where similar protection is required.

The invention claimed is:

1. A containment case comprising:
    a primary impact region;
    a root impact region;
    a composite core with an inner surface and comprising a first material wherein the composite core extends over the primary impact region and the root impact region; and
    at least one ceramic layer integrated with the composite core at least in the primary impact region, wherein the at least one ceramic layer comprises a ceramic fabric and is bonded to the inner surface of the composite core with a resin, wherein the ceramic fabric comprises a second material, and wherein the first and second materials are different.

2. The containment case of claim 1, wherein the second material is selected from the group consisting of alumina, silica, zirconia, boron, quartz, silicon carbide, titanium dioxide, tungsten carbide, boron oxide and combinations thereof.

3. The containment case of claim 1, wherein the ceramic fabric comprises at least the second material and a third material, wherein the second and third materials are selected from the group consisting of alumina, silica, zirconia, boron, quartz, silicon carbide, titanium dioxide, tungsten carbide, boron oxide and combinations thereof.

4. The containment case of claim 1, wherein the composite core comprises at least one non-ceramic fabric comprising the first material, which is selected from the group consisting of at least one of carbon fiber, graphite fiber, polyimide fiber, aromatic polyamide fiber, ultra-high molecular weight polyethylene, and combinations thereof.

5. The containment case of claim 4, wherein the containment case comprises a plurality of ceramic layers integrated with the composite core and disposed in the primary impact region, and wherein the ceramic layers and the non-ceramic fabric are situated alternately to enhance an impact resistance of an inner portion of the containment case within the primary impact region.

6. The containment case of claim 1, further comprising at least one composite layer disposed on an inner surface of the at least one ceramic layer.

7. The containment case of claim 1, wherein the at least one ceramic layer is coextensive with a length of the composite core.

8. The containment case of claim 1, further comprising at least one ceramic layer integrally bonded to an outer surface of the composite core.

9. The containment case of claim 1 characterized by a substantially uniform thickness over an axial length of the containment case including the primary impact region and the root impact region.

10. The containment case of claim 9, further comprising an energy absorbing layer disposed within the root impact region on the inner surface of the composite core.

11. The containment case of claim 10, wherein the energy absorbing layer comprises an energy absorbing material selected from the group consisting of polyurethane, rubber, silicone, fluoro silicone, fluoroelastomer, and combinations thereof.

12. The containment case of claim 1, wherein the at least one ceramic layer is integrated with the composite core in the primary impact region and the root impact region.

13. A method of fabricating a containment case having a primary impact region and a root impact region and a composite core that extends over the primary impact region and the root impact region, the method comprising:
    disposing one or more layers of ceramic fabric on an inner surface of the composite core at least in the primary impact region, wherein the composite core comprises a first material, wherein the ceramic fabric comprises a second material, and wherein the first and second materials are different;
    infusing the composite core and the one or more layers of ceramic fabric with resin; and
    curing the resin.

14. The method of claim 13, further comprising disposing one or more layers of a composite material on an inner surface defined by the one or more layers of ceramic fabric, wherein the infusing step comprises infusing the composite core, the one or more layers of ceramic fabric and the one or more layers of a composite material with resin.

15. The method of claim 13, further comprising alternately disposing layers of a composite material with the one or more layers of the ceramic fabric, wherein the infusing step comprises infusing the composite core, the one or more layers of ceramic fabric and the one or more layers of a composite material with resin.

16. The method of claim 13, wherein the second material comprises at least one ceramic fiber selected from the group consisting of alumina, silica, zirconia, boron, quartz, silicon carbide, titanium dioxide, tungsten carbide, and boron oxide, and wherein the composite core comprises at least one material selected from the group consisting of carbon fiber, graphite fiber, polyimide fiber, aromatic polyamide fiber, ultra-high molecular weight polyethylene, and combinations thereof.

17. The method of claim 13, further comprising disposing a ceramic layer on an outer surface of the composite core prior to performing the infusing step.

* * * * *